United States Patent [19]
Zehrung

[11] Patent Number: 5,791,834
[45] Date of Patent: Aug. 11, 1998

[54] FIXTURE FOR DRILLING A LONGITUDINAL HOLE IN A DOOR

[76] Inventor: Raymond E. Zehrung, 3029 Cameron Way, Santa Clara, Calif. 95051

[21] Appl. No.: 845,621

[22] Filed: Apr. 25, 1997

[51] Int. Cl.⁶ .................................................. B23B 39/00
[52] U.S. Cl. ...................... 408/1 R; 408/97; 408/103; 408/115 R; 408/241 G
[58] Field of Search .................. 408/103, 97, 115 R, 408/241 G, 1 R

[56] References Cited

U.S. PATENT DOCUMENTS

| | | | |
|---|---|---|---|
| 3,552,239 | 1/1971 | Yeaman et al. | 408/103 |
| 3,598,496 | 8/1971 | Skinner | 408/115 R |
| 3,626,513 | 12/1971 | Pytlak | 408/115 R |
| 3,864,053 | 2/1975 | Harwood | 408/115 R |
| 4,331,411 | 5/1982 | Kessinger et al. | 408/97 |
| 4,865,496 | 9/1989 | Challis | 408/115 R |
| 4,948,304 | 8/1990 | Kobayashi | 408/115 R |
| 4,978,257 | 12/1990 | Nowman | 408/115 R |

Primary Examiner—Daniel W. Howell
Assistant Examiner—Adesh Bhargava
Attorney, Agent, or Firm—David R. Gildea

[57] ABSTRACT

A door drilling fixture for drilling a long straight longitudinal hole in a door. The fixture includes an elongated frame having a U-shaped cross-section for mounting about the hinged edge of a door and an arm projecting from and pivotally engaged to the frame for guiding a long drill bit. The door is placed between the right and left sections and the door edge flat against the center section of the U-shaped frame. Two hold-down bolts thread through upper and lower portions of the left section of the U-shaped frame to press the door against the right section of the U-shaped frame. Slots in the frame mechanically isolate the upper and lower portions of the left section from the middle portion of the center section. The arm houses two spaced apart drill bushings having a center line for rotationally engaging and guiding the drill bit through the drill bit aperture and into the edge of a door. The pivot line between the arm and the frame intersects the center line of the drill bushings, thereby enabling the arm to be pivoted for changing the inclination of the drill bit without changing the entry point of the drill bit on the door jamb edge.

16 Claims, 2 Drawing Sheets

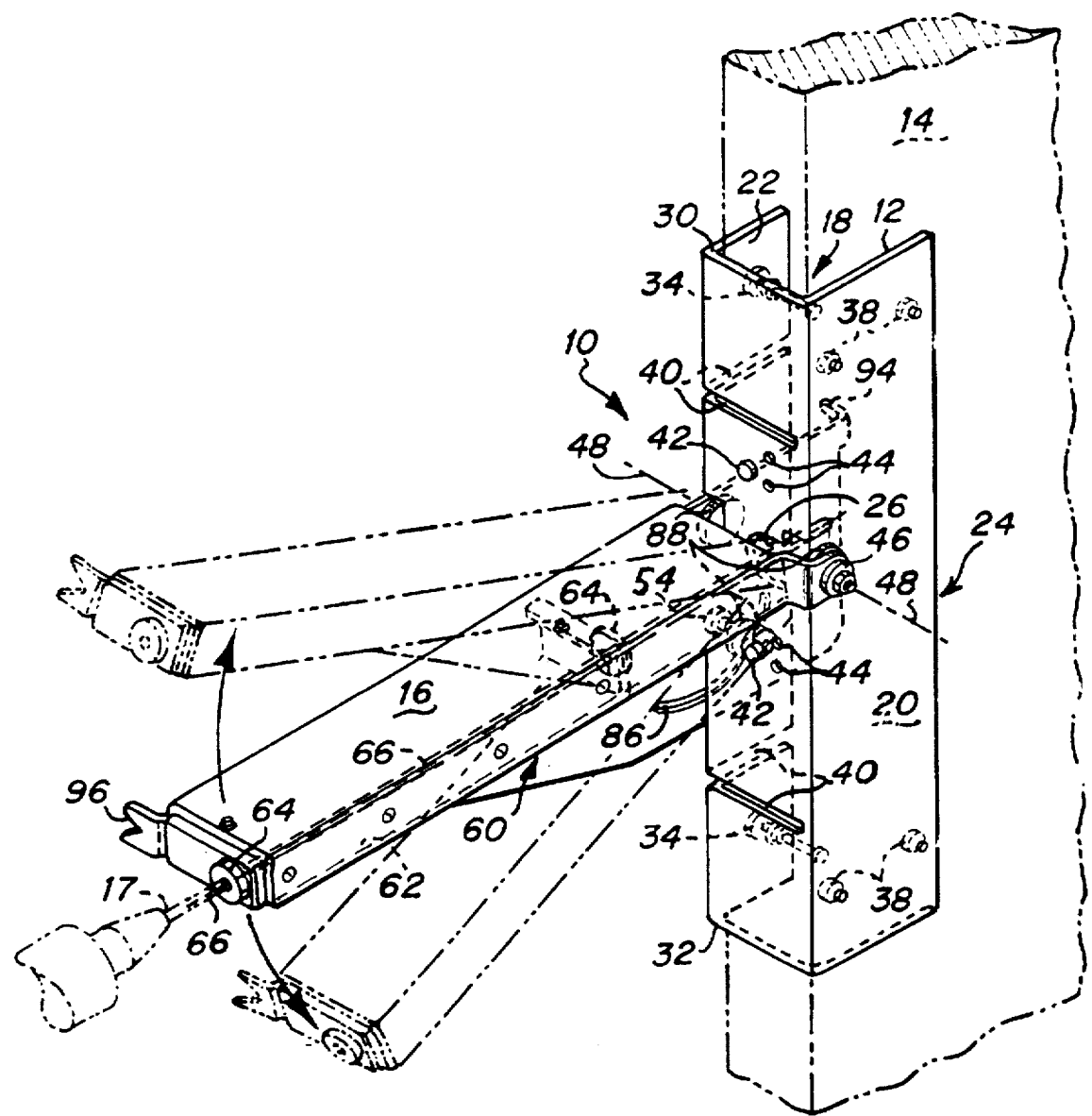
Fig_1

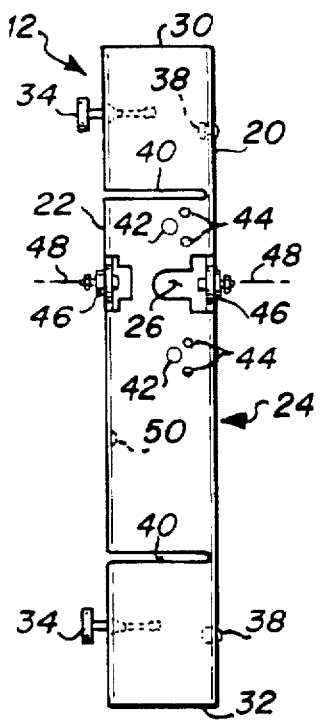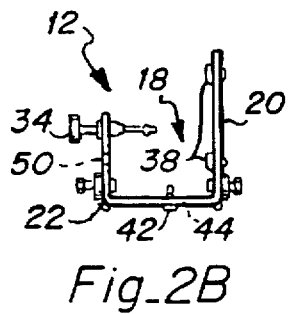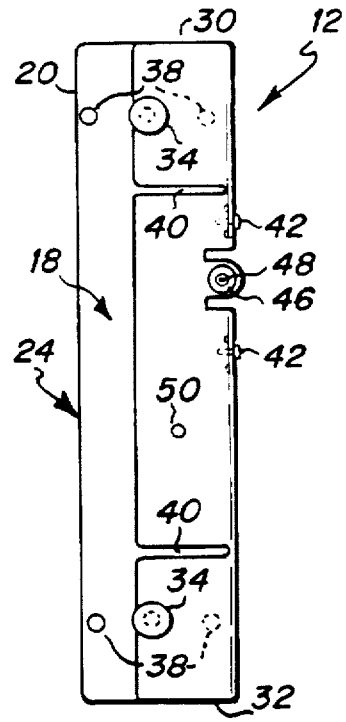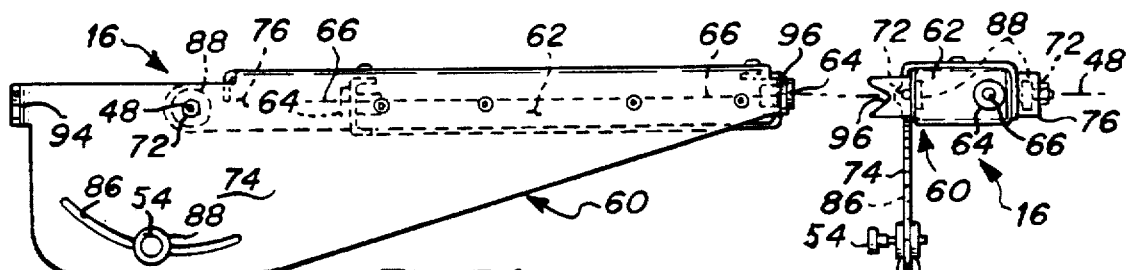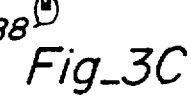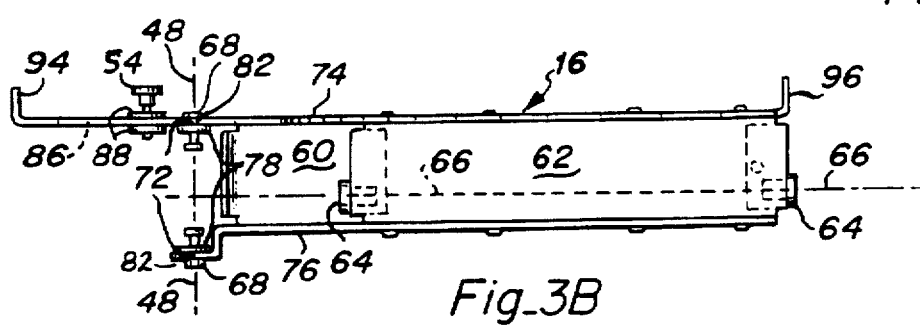

FIXTURE FOR DRILLING A LONGITUDINAL HOLE IN A DOOR

BACKGROUND OF THE INVENTION

1. Field of the Invention

The invention relates generally to drilling fixtures and more particularly to a fixture for drilling a longitudinal hole in a door.

2. Description of the Prior Art

A door is sometimes required to have an electrified device such as card key reader, a powered latch, or a latch monitor. In order to carry electricity to the device, a cable is routed through a longitudinal hole that is drilled from the hinged edge of the door to the device. In a typical application for a 1¾ inch thick industrial door, the longitudinal hole is ⅝ inch in diameter and may be 3 feet or more long. To prevent weakening the door or causing the door to become less fire resistant the hole must be centered and straight to within ¼ inch. Such hole is difficult to drill in the best of circumstances but is especially difficult to drill on a building site. Consequently, most doors that require electrified devices are pre-drilled in a factory environment. However, it would be more convenient and in some cases it is required to drill the door on site.

BRIEF SUMMARY OF THE INVENTION

It is therefore an object of the present invention to provide a door drilling fixture that can be used on a building site for drilling a long straight longitudinal hole in a door.

Briefly, in a preferred embodiment, the door drilling fixture includes an elongated frame having a U-shaped cross-section for mounting about the hinged edge of a door and an arm projecting from and pivotally engaged to the frame for guiding a long drill bit. In operation, the long dimension of the frame is vertical with the center section of the "U" flat against the door edge. The right and left sections of the "U" enclose the door on either side. Two hold-down bolts thread through upper and lower portions of the left section of the U-shaped frame to press the door against the right section of the U-shaped frame. A middle portion of the center section includes a drill bit aperture for allowing a drill bit to pass through. Slots in the frame mechanically isolate the upper and lower portions from the middle portion of the frame in order to prevent the frame from being cocked when the hold-down bolts are tightened. The arm houses two spaced apart drill bushings for rotationally engaging and guiding the drill bit on a drill center line through the drill bit aperture and into the edge of the door. The pivot line on which the arm and the frame are pivotally engaged intersects the drill center line, thereby enabling the arm to be pivoted for changing the inclination of the drill bit without changing the entry point of the drill bit into the edge of the door. The arm includes a sight having two sight points for sighting along the arm at the same level and parallel to the drill center line as an aid for aiming the drill bit toward a desired destination within the door. The fixture may be used either end up in order to drill either a left or right opening door without taking the door off the wall.

These and other objects of the present invention will no doubt become obvious to those of ordinary skill in the art after having read the following detailed description of the preferred embodiments which are illustrated in the various figures.

BRIEF DESCRIPTION OF SEVERAL VIEWS OF THE DRAWINGS

FIG. 1 is a top front perspective view of a door drilling fixture of the present invention;

FIGS. 2A, 2B, and 2C are a front view, a top view, and a left side view, respectively, of a U-shaped frame of the fixture of FIG. 1; and FIGS. 3A, 3B, and 3C are a left side view, a bottom view, and a front end view, respectively, of an arm of the fixture of FIG. 1 pivotally projecting from the frame of FIGS. 2A–C.

DETAILED DESCRIPTION OF THE INVENTION

FIG. 1 illustrates a three dimensional view of a door drilling fixture of the present invention referred to by the general reference number 10 as seen from the top and front. The door drilling fixture 10 includes an elongated U-shaped frame 12 for mounting around the edge of a door 14 and an arm 16 projecting from and pivotally engaged to the frame 12 for guiding a long drill bit 17 for drilling a longitudinal hole starting at the hinge edge of the door 14.

The frame 12, illustrated with a front, top, and left side view in FIGS. 2A, 2B, and 2C, respectively, includes a flat rectangular center section 18 approximately nineteen inches high by three and one-quarter inches wide, a flat rectangular right section 20 approximately nineteen inches high by four and one-half inches wide, and a flat rectangular left section 22 approximately nineteen inches high by two and one-half inches wide where the planes of the right section 20 and the left section 22 are parallel to each other and at ninety degrees to the plane of the center section 18. In operation, the door 14 is placed between the right section 20 and the left section 22 and with the edge of door 14 flat against the center section 18. In a preferred embodiment, the center section 18, right section 20, and left section 22 are folded from a single piece of three-sixteenths inch Aluminum. It is important to hold a tight tolerance for the ninety degrees between the right section 20 and the center section 18. A middle portion 24 of the center section 18 includes a drill bit aperture 26 for allowing the drill bit 17 to pass through. An upper portion 30 and a lower portion 32 of the left section 22 include a threaded hole, PIM, threaded insert, or the like for accepting hold-down bolts 34. The hold-down bolts 34 each include a knob for being turned by hand at one end and a rotationally connected stopper for contact with the door 14 at the other end. Alternatively, other mechanisms using mechanical devices such as but not limited to screws, springs, latches, ratchets, and the like and/or hydraulic or pneumonic devices could be used for holding the door 14 in place. The right section 20 includes several stopper platforms 38 press fit into undersized holes. The hold-down bolts 34 are turned to press and hold the door 14 tightly against the stopper platforms 38. Slots 40 between the upper portion 30 of the left and center sections 22,18 and the middle portion 24 of the left and center sections 22,18; and between the lower portion 32 of the left and center sections 22,18 and the middle portion 24 of the left and center sections 22,18 provide mechanical isolation so that the force exerted by the hold-down bolts 34 causes the upper and lower portions 30,32 of the left section 22 to bend slightly but do not cause the frame 12 to cock to one side when the hold-down bolts 34 are tightened against the door 14. A pair of locating pins 42 thread or press through two or more holes 44 in the middle portion 24 of the center section 18 and extend into the U-shaped interior area of the frame 12. The holes 44 have spacings corresponding to the spacings of hinge attachment holes for several standard hinges for hanging the door 14. The pins 42 insert through the hinge attachment holes for vertically positioning the entry point of the drill bit 17. Pivot holes 46 in the left and right sections 22,20 are aligned to enable the arm 12 to pivot up and down relative to the frame 12 about a pivot line 48. A threaded hole 50 accepts a bolt 54 (FIGS. 3a–c) for holding the arm 16 in place once the arm 16 has been pivoted to the desired up or down inclination.

The arm 16 illustrated with a left side, a bottom, and a front end view in FIGS. 3A, 3B, and 3C, respectively, includes an elongated channel 60 approximately twenty-one inches long including an elongated box section 62 approximately twelve inches long. In a preferred embodiment the channel 60 is folded from a single piece of one-eighth inch Aluminum. The box section 62 is constructed by riveting a five sided box of sixty thousandths inch Aluminum into the channel 60 with the open side of the box facing the center section of the channel 60. Of course, many other ways of constructing such elongated channel 60 and box section 62 are well-known to mechanical engineers and the preferred embodiment presented herein is not intended to be limiting. Two drill bushings 64 having a drill center line 66 are pressed and retained in the ends of the box section 62 for rotationally engaging and guiding the drill bit 17 along the drill center line 66 through the drill bit aperture 26 and into the door 14. In a preferred embodiment, pivot pins 68 aligned to the pivot line 48 pass through pivot holes 72 in a left side 74 and a right side 76 of the channel 60; through pivot bushings 78; and through the pivot holes 46 in the right section 20 and left section 22 of the frame 12; and are retained by threaded nuts 82, retainers, or the like. Of course, it is well-known to mechanical engineers that there are many alternative embodiments for constructing a pivot for a pivoting arm and the mode described herein is not intended to be limiting. The pivot line 48 intersects the drill center line 66 so that the arm 16 may be pivoted to change the inclination of the drill bit 17 without changing the point at which the drill bit 17 enters the door 14. The bolt 54 passes through a curved slot 86 in the left side 74 of the channel 60, a clutch bushing 88, and threads into the threaded hole 50 in the left section 22 of the frame 12. The arm 16 includes a sight including a first sighting piece 94 and a second sighting piece 96 constructed as Vee's and aligned on the same vertical level and parallel to the drill center line 66. In a preferred embodiment the drill bushings 64 are constructed of DELRIN. Typically, a three-eighths inch drill bit 17 is used. A three-eighths inch tube is sometimes used as a sleeve in the longitudinal hole once the hole is drilled. In operation, the first and second sights 94,96 are used for aiming the drill bit 17 toward the desired destination in the door 14 while the arm 16 is pivoted about the pivot line 48. When the desired sight is obtained, the bolt 54 is tightened and the inclination of the arm 16 relative to the frame 12 is fixed. Where it is available, the three-eighths inch tube or a long rod may be laid in the Vee's of the first and second sighting pieces 94 and 96 for sighting the drill bit 17.

The descriptive terms right and left as used above describe the fixture 10 as it would be used for drilling a right opening door 14 while the door 14 is mounted place on a wall jamb. For use with a left opening door 14, the fixture 10 would be rotated so that the upper end of the frame 12 would become the lower end and the descriptive terms right and left would be reversed in the description.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A fixture for drilling a longitudinal hole in a door, comprising:
   an elongated U-shaped frame comprising:
     an elongated center section having a drill bit aperture for placement flat against an edge of said door;
     an elongated right section at about 90 degrees to said center section for placement against one side of said door; and
     an elongated left section at about ninety degrees to said center section having an adjustable pressing means for pressing against the opposite side of said door so that said one side of said door is pressed against said right section of the frame; and
   an arm projecting from the frame, comprising:
     at least two spaced apart drill bushings having a drill center line parallel to said right section of the frame and aligned through said drill bit aperture, the drill bushings for accepting a drill bit for drilling said longitudinal hole.

2. The fixture of claim 1, wherein:
   the frame further comprises a slot disposed between said pressing means and said drill bit aperture, said slot extending through said left section for mechanically isolating a portion of said frame adjacent to said pressing means from a portion of said frame adjacent to said drill bit aperture.

3. The fixture of claim 1, further comprising:
   pivoting means for enabling the arm to pivot about a pivot line within a plane parallel to said right section.

4. The fixture of claim 3, wherein:
   said pivot line intersects said drill center line.

5. The fixture of claim 1, wherein:
   the arm further comprises a sight for sighting parallel to said drill center line for aiming said drill bit in a direction parallel to a desired said longitudinal hole.

6. The fixture of claim 1, wherein:
   said center section further comprises locating means for positioning the frame relative to a position of a hinge for mounting said edge of said door to a wall.

7. The fixture of claim 6, wherein:
   said locating means includes at least one pin for placement in a hinge attachment hole for locating the frame with respect to said hinge.

8. The fixture of claim 1, wherein:
   said pressing means includes a hold-down bolt for pressing said door against said right section.

9. The fixture of claim 1, wherein:
   the arm further comprises a box section having two ends, each end for mounting one of said drill bushings.

10. A method for drilling a longitudinal hole in a door, comprising steps of:
    placing an elongated center section of an elongated U-shaped frame against an edge of said door, said center section having a drill bit aperture;
    holding a first side of said door against an elongated right section of said frame, said right section at about ninety degrees to said center section;

placing a drill bit through at least two drill bushings having a drill center line aligned through said drill bit aperture and parallel to said right section, said drill bushings retained in an arm projecting from said frame; and drilling said longitudinal hole in said door with said drill bit.

11. The method of claim 10, wherein:

the step of holding said first side of said door further comprises steps of screwing a hold-down bolt through a left section of said U-shaped frame and pressing against a second side of said door from said left section.

12. The method of claim 11, wherein:

said left section includes a slot in said frame between a portion of said frame where said hold-down bolt is screwed and a portion of said frame adjacent to said drill bit aperture for preventing said frame from becoming cocked when said second side of said door is being pressed against said right section of said frame.

13. The method of claim 10, further comprises a step of:

inclining said arm in a plane parallel to the plane of said right section about a pivot line intersecting said drill center line.

14. The method of claim 10, further comprises a step of:

sighting along said door parallel to said drill bit for aiming said drill bit in a direction parallel to a desired said longitudinal hole.

15. The method of claim 10, further comprises a step of:

positioning said frame relative to a hinge for attaching said door by inserting a pin attached to said center section into a hinge attachment hole.

16. The method of claim 10, wherein:

the arm includes a box section having two ends, each end for mounting one of said drill bushings.

* * * * *